Patented Oct. 14, 1941

2,259,222

UNITED STATES PATENT OFFICE 2,259,222

PREPARATION OF SULPHANILAMIDE DERIVATIVES

Arthur James Ewins, Gidea Park, Romford, and Montague Alexander Phillips, Romford, England, assignors to May & Baker, Limited, London, England, a company of Great Britain No Drawing. Original application November 1, 1938, Serial No. 238,164. Divided and this application April 19, 1940, Serial No. 330,527. In Great Britain, Australia, India, and New Zealand November 29, 1937

2 Claims. (Cl. 260—288)

This is a division of co-pending application Ser. No. 238,164, filed November 1, 1938, for "The preparation of new therapeutically useful heterocyclic compounds."

The present invention relates to the preparation of p-amino-benzene-sulphonamido derivatives of the pyridine, quinoline and isoquinoline series, many of which have marked bactericidal properties and are capable of therapeutic application.

The compounds prepared according to the present invention are of the type

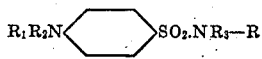

in which R represents a heterocyclic nucleus of the pyridine, quinoline or isoquinoline series and in which $R_1$ may be hydrogen, acyl, alkyl, aryl or aralkyl, and $R_2$ may be hydrogen or alkyl and $R_3$ may be hydrogen, alkyl, aryl, aralkyl or acyl.

According to the present invention these compounds may be prepared by various methods which may be summarised as follows:

A. Derivatives in which $R_1$, $R_2$ and $R_3$ are hydrogen atoms may be prepared by condensing a compound of the type p-X $C_6H_4Y$ with a compound of the type ZR in which R is a pyridine, quinoline or isoquinoline residue, and when Y is $SO_2Cl$, X is $NH_2$ and when Y is $SO_2NH_2$ Z is a halogen, to form compounds of the type

X $C_6H_4SO_2NHR$ which can be readily converted into compounds of the type $NH_2C_6H_4SO_2NHR$. X therefore represents a group such as an acylamino group, a nitro group, an azo group linked to an organic radicle, or a halogen, which groups may be converted into an amino group by hydrolysis in the first mentioned case, by reduction in the second- and third-mentioned cases, or by the action of ammonia in the fourth case.

B. Similarly, derivatives in which $R_1$ and $R_2$ are hydrogen atoms, and $R_3$ an aryl, alkyl, or aralkyl group may be prepared by condensation of compounds of the type p-X $C_6H_4Y$ with compounds of the type ZR in which when Y is $SO_2Cl$, Z is $NHR_3$ and when Y is $SO_2NHR_3$, Z is a halogen to form compounds of the type p-X $C_6H_4SO_2NR_3R$ from which the required amino products may be obtained as described in paragraph A.

C. Derivatives in which $R_1$ is hydrogen or an alkyl or acyl group, $R_2$ is an alkyl, aryl, or aralkyl group and $R_3$ is either hydrogen or an alkyl, aryl, or aralkyl group may be prepared by condensing a compound of the type $R_1R_2N.C_6H_4Y$ with a compound of the type ZR in which R is the residue of a pyridine, quinoline or isoquinoline base, and when Y is $SO_2Cl$, Z is $NHR_3$ and when Y is $SO_2NHR_3$, Z is a halogen.

D. Derivatives in which $R_1$ is a hydrogen or alkyl, $R_2$ is an alkyl, and $R_3$ is hydrogen or an alkyl, aryl or aralkyl group may be prepared from condensation products of the types described in A and B in which X is a halogen by reacting on the respective halogenated condensation products with a primary or secondary amine instead of with ammonia.

E. Acyl, alkyl, aryl or aralkyl derivatives of compounds prepared by the foregoing methods containing one or more replaceable hydrogen atoms attached to nitrogen may be prepared by known methods such as by the use of acyl, alkyl, aryl, or aralkyl halides or alkyl sulphates.

Besides using compounds of the type p-X.$C_6H_4SO_2Cl$,

various chemically equivalent processes may be used instead, such as the use of the anhydrides (p-X.$C_6H_4SO_2)_2O$ or the bromides p-X.$C_6H_4SO_2Br$.
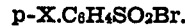

The following examples illustrate how the invention may be carried out in practice, but it is to be understood that the invention is in no way limited to the details given in these examples:

Example 1

2-amino-pyridine (9.4 grams) is dissolved in 20 cc. of dry pyridine and 23.5 grams of p-acetyl-amino-benzene-sulphonyl chloride is added and the mixture heated on the steam bath. Water is then added and the precipitated 2-(p-acetyl-amino-benzene-sulphonamido) pyridine, M. Pt. 224° C., hydrolysed by boiling with 175 cc. of 2N sodium hydroxide solution. The solution is cooled and made just acid to litmus by addition of 2N hydrochloric acid. The precipitate of 2-(p-amino-benzene-sulphonamido)-pyridine is collected and recrystallised from water. Melting point 190° C.

Example 2

To 16 grams of 6-amino-quinaldine dissolved in 30 cc. of dry pyridine is added 24 grams of p-acetylamino-benzene-sulphonyl-chloride. After heating on a steam bath for 1 hour and diluting with water, the crystalline precipitate is collected, washed and purified by precipitation of the solution in normal sodium hydroxide solution with excess of boiling 2N acetic acid. It melts at 272° C.

This is converted to the amino compound by refluxing for 30 minutes with ten times its weight of 2N sodium hydroxide solution. On acidification to litmus, the base is obtained as a gum which rapidly crystallises. Alternatively, hydrolysis may be effected by heating under reflux with 12 parts of dilute 15% hydrochloric acid for 1 hour and adding 50% sodium hydroxide solution until the solution is still acid to litmus but not to Congo red. The precipitated product is purified by solution in boiling alcohol and precipitation with water. Melting point 252° C.

Example 3

To a solution of 4.7 grams of 2-amino-pyridine in 10 cc. of dry pyridine is added, with cooling, 12 grammes of p-nitro-benzene-sulphonyl-chloride. An energetic reaction results: when this is over, the mixture is diluted with water, (200 cc.) and the precipitate of 2-(p-nitro-benzene-sulphonamido)-pyridine collected. Melting point 185° C.

The nitro compound (1.4 grams) is dissolved in about 5 cc. of 2N sodium hydroxide solution and the suspension of Na salt formed on standing is added at 20° C. to a paste of ferrous hydroxide from 10 grams ferrous sulphate (hydrated) in 30 cc. water and 3 grams sodium hydroxide in 5 cc. of water. After standing (1 hour) the mixture is filtered from ferric hydroxide and the filtrate acidified with acetic acid. The 2-(p-amino-benzene-sulphonamido)-pyridine melts at 190° C.

Example 4

16.5 grams of p-chlorobenzene-sulphonyl-chloride is added to a solution of 7 grams of 2-amino-pyridine in 20 cc. of pyridine. After heating at 90° C. for 15 minutes, water is added and the precipitated 2-(p-chlorobenzene-sulphonamido)-pyridine is collected, washed and dried, M. Pt. 186° C. This is then heated in a closed vessel with 4 parts by weight of concentrated aqueous ammonia in the presence of about 1/20 part by weight of cuprous chloride for 13 hours at 150–175° C.

The excess of ammonia is removed and on dilution with water, 2-(p-amino-benzene-sulphonamido)-pyridine is obtained and may be purified by crystallisation from water.

Example 5

A mixture of 21.4 grams of p-acetylamino-benzene-sulphon-amide, 13.0 grams of anhydrous potassium carbonate, 1.0 gram of copper powder and 15.8 grams of 2-bromo-pyridine is heated at 200–240° for 1 hour. The melt is dissolved in boiling water and filtered. On acidification with acetic acid, 2-(p-acetylaminobenzene-sulphonamido)-pyridine, M. Pt. 224° is obtained from which 2-(p-amino-sulphonamido)-pyridine is formed by alkaline hydrolysis.

Example 6

10 grams of p-nitro-benzene-sulphonic acid anhydride (prepared by the action of thionyl chloride on p-nitro-benzene-sulphonic acid dihydrate) are added to a solution of 5 grams of 2-amino-pyridine in 25 cc. of pyridine. The reaction mixture becomes warm and a precipitate of 2-(p-nitro-benzene-sulphonamido)-pyridine is formed. The reaction mixture is diluted with water and dried. Melting point 195° C.

This compound on reduction according to the method of Example 3 yields 2-(p-amino-benzene-sulphonamido)-pyridine.

Example 7

2.5 grams of 2-(p-amino-benzene-sulphonamido)-pyridine is suspended in 10 cc. of pyridine at laboratory temperature and 2 grams p-nitro-benzoyl chloride is added. The mixture is allowed to cool, diluted with water, and the precipitated 2-[p-(p¹-nitro benzoyl amino)-benzene sulphonamido] pyridine filtered off, washed with water and dried. Melting point 272°.

Example 8

5.4 grams of 5-amino-8-methoxy-quinoline is dissolved in 10 cc. of pyridine, 7.3 grams of p-acetylamino-benzene-sulphonyl chloride added, and the mixture heated at 90° C. for a short time. Water is then added and the precipitated 5-(p-acetylamino benzene sulphonamido)-8-methoxy quinoline filtered off and crystallised from dilute alcohol. Melting point 185° C.

On hydrolysis of this acetyl compound by boiling with 10 parts of 2.N sodium hydroxide followed by neutralisation to Congo red, 5-(p-amino-benzene-sulphonamido)-8-methoxy quinoline is obtained, which recrystallised from water, melts at 228–230° C.

Example 9

6.6 grams of 2:6 diamino-pyridine is dissolved in 40 cc. of pyridine and 29.0 grams of p-acetyl-amino-benzene-sulphonyl chloride added. When the reaction mixture has cooled, water is added and the precipitated 2:6 di(p-acetylamino-benzene-sulphonamido) pyridine crystallised by solution in boiling alcoholic sodium hydroxide and reprecipitation with hot acetic acid. Melting point 275° C. On hydrolysis by boiling for 1 hour with 100 cc. of 2N caustic soda solution, and acidifying with dilute acetic acid 2:6 di(p-amino-benzene-sulphonamido)-pyridine is precipitated. The crude product is purified by solution in boiling dilute sodium hydroxide and acidifying with dilute acetic acid, when the pure crystalline product, melting point 255° C., is obtained.

Example 10

5 grams of 2-hydroxy-4-methyl-7-amino-quinoline are suspended in 25 cc. of pyridine, 6.8 grams of p-acetylamino-benzene-sulphonyl chloride added, and the mixture heated on the water bath for a short time. On dilution with water (100 cc.) the precipitated 2-hydroxy-4-methyl-7-(p-acetyl-amino-benzene-sulphonamido) quinoline is precipitated, filtered off, washed with water and crystallised from dilute alcohol. Melting point 304° C.

On hydrolysis of this compound by boiling for 1 hour with 10 parts of dilute caustic soda and subsequently acidifying with dilute acetic acid 2 hydroxy-4 methyl 7-(p-amino-benzene-sulphonamido)-quinoline is precipitated. After purification by solution in hot dilute sodium hydroxide and re-precipitation by acidifying with hot acetic acid the pure compound melts at 289° C.

Example 11

14 grams of 2 amino-pyridine-3-carboxylic acid is suspended in 100 cc. of pyridine and 24 grams of p-acetyl-amino-benzene sulphonyl chloride added. The mixture is heated on the water bath for 10 minutes, diluted with water, and the precipitated 3 carboxy-2-(p-acetylamino benzene-sulphonamido)-pyridine recrystallised from alcohol. M. Pt. 175° C. (dec). On hydrolysis by boiling with 10 parts of dilute sodium hydroxide solution and acidifying with dilute acetic acid 3 carboxy - 2 -(p-amino-benzene-sulphonamido) - pyridine is precipitated, which is obtained crystalline by solution in hot dilute sodium hydroxide and acidification with acetic acid. Melting point 176°–179° C.

*Example 12*

10.8 grams of 2-amino-6-methyl pyridine is suspended in 20 cc. of pyridine, 23.5 grams of p-acetylamino-benzene-sulphonyl chloride added, and the mixture heated on the water bath for 10 minutes. On dilution with water crude 6-methyl-2-(p-acetylamino-benzene sulphonamido) pyridine separates and is collected and after crystallisation from dilute acetic acid melts at 215° C. It is boiled with 150 cc. of 2N sodium hydroxide solution, filtered, and 150 cc. of 2N acetic acid added, and pure crystalline 6-methyl-2-(p-amino-benzene sulphonamido) pyridine thereby precipitated. Melting point 219° C. after recrystallisation from dilute acetic acid.

*Example 13*

14 grams of 6-amino-quinoline are dissolved in 30 cc. of quinoline and 24 grams of p-acetylamino-benzene-sulphonyl chloride added. The mixture is heated on a steam bath for about 30 minutes and diluted with 300 cc. of water when 6-(p-acetylamino-benzene sulphonamido)-quinoline is precipitated, filtered off, washed with water and recrystallised. Melting point 275° C. On hydrolysis with ten parts of boiling 2N caustic soda solution for 1 hour and acidifying with dilute acetic acid 6-(p-amino-benzene-sulphonamido)-quinoline is obtained. After crystallisation from dilute alcohol it melts at 200° C.

*Example 14*

4.7 grams of 2-amino pyridine are dissolved in 20 cc. of benzene, 12 grams of p-acetylamino-benzene-sulphonyl chloride added and the mixture allowed to stand. The solid which separates is filtered off and boiled for 1 hour with 90 cc. of 2N caustic soda solution. On acidification with dilute acetic acid 2-(p-amino-benzene sulphonamido)-pyridine is precipitated and recrystallised from acetone. Melting point 190° C.

*Example 15*

2 grams of 2-(p-chlor-benzene-sulphonamido) pyridine (Example 4) or 2 grams of 2-(p-brom-benzene-sulphonamido) pyridine (obtained in a similar manner from p-brom-benzene-sulphonyl chloride and 2 amino-pyridine) is heated in a closed vessel with 8 cc. of a 30 per cent. aqueous solution of methylamine, and 0.1 gram of cuprous chloride for 12 hours at 150° C. After cooling, the reaction mixture is diluted with water and the precipitated 2(p-methyl-amino-benzene-sulphonamido) pyridine purified by recrystallisation from alcohol. Melting point 154° C.

*Example 16*

9 grams of 2:4 dinitro-diphenylamino-4¹-sulphonyl chloride prepared by the action of phosphorous pentachloride on the sodium salt of the corresponding sulphonic acid is added to a solution of 2.3 grams of 2-amino-pyridine in 20 cc. of pyridine. When the reaction is complete, water is added and the precipitated 2-(p-(2:4 dinitrophenylamino)- benzene sulphonamido)-pyridine filtered off, washed, and crystallised from its solution in hot dilute alcoholic caustic soda by addition of 50 per cent. acetic acid. Melting point 230–233° C.

*Example 17*

5 grams of 2-(p-chlorbenzene-sulphonamido)-pyridine are heated in a closed vessel with 20 cc. of a 30 per cent. aqueous solution of dimethylamine and 0.25 gram of cuprous chloride at 170° C. for 12 hours. After cooling, the contents of the tube are diluted with water and the precipitate extracted with cold dilute hydrochloric acid. Sodium acetate is then added to the acid extract and the precipitated 2-(p-dimethylamino-benzene sulphonamido)-pyridine recrystallised from alcohol. It melts at 218–220° C.

*Example 18*

15 grams of 4-amino-pyridine are dissolved in 80 cc. of water, 40 grams of p-acetyl-amino-benzene-sulphonyl chloride added followed by 10 grams of anhydrous sodium carbonate. The mixture is stirred at room temperature for 1 hour and the precipitated 4-(p-acetylamino-benzene sulphonamido)-pyridine filtered off and washed with water. Crystallised from alcohol it melts at 252° C. Hydrolysis by boiling with 400 cc. of 2N caustic soda solution for 1 hour and acidifying the resulting solution with dilute acetic acid gives 4 - (p - amino-benzene - sulphonamido) pyridine which on recrystallisation from dilute alcohol melts at 240° C.

*Example 19*

21.4 grams of p-acetylamino-benzene-sulphonamide, 13.5 grams of potassium carbonate, 1.0 grams of copper powder and 16.4 grams of 2-chloro-quinoline are heated together under reflux for 1½ hours at 240–250° C. The cooled reaction mass is extracted with boiling water filtered and the filtrate acidified with acetic acid when crude 2-(p-acetylamino-benzene-sulphonamido) quinoline is precipitated.

On hydrolysis by boiling with 160 cc. of 2N sodium hydroxide for 1 hour and acidifying the resulting solution with acetic acid 2-(p-amino-benzene-sulphonamido) quinoline is obtained which after re-solution in boiling dilute alkali and acidifying with hot acetic acid is obtained crystalline. Melting point 193–195° C.

*Example 20*

17 grams of 2-(p-dimethylaminobenzene-sulphonamido)-pyridine (Example 17) is dissolved in 60 cc. of 2N sodium hydroxide solution, and 7 grams of dimethyl sulphate added with stirring to the cooled solution. 2-(p-dimethylamino-benzene-sulphonmethylamido) pyridine separates as an oil which rapidly solidifies and when recrystallised from dilute acetic acid melts at 155° C.

*Example 21*

20 grams of 2-(p-amino-benzene-sulphonamido)-pyridine is dissolved in 120 cc. of 2N sodium hydroxide solution and 8 cc. of dimethyl sulphate are added. After shaking for 30 minutes the precipitated 2-(p-amino-benzene-sulphonmethyl amido) pyridine is filtered off, washed with water and crystallised from alcohol. It melts at 225° C.

*Example 22*

9.6 grams of 6 amino-quinaldine is dissolved in 27 cc. of pyridine and 11.8 grams of p-nitro-benzene-sulphonic-acid-anhydride added. When the reaction is complete about 500 cc. of water is added and the precipitated 6-(p-nitro-benzene sulphonamido) quinaldine is filtered off and washed with water.

On reduction with ferrous hydroxide as described in Example 3, 6-(p-amino-benzene-sulphonamido)-quinaldine, melting point 252° C., is obtained.

*Example 23*

6.4 grams of 2-amino-pyridine is dissolved in 50 cc. of pyridine and 22 grams of p-acetyl-benzyl - amino - benzene - sulphonyl - chloride (British Patent 483,945) is added. When the reaction is complete the mixture is diluted with water and filtered, and the residual 2-(p-acetyl-benzyl-amino-benzene-sulphonamido) pyridine crystallised from alcohol. Melting point 177° C.

The acetyl compound on boiling with 30% sodium hydroxide solution for 12 hours and acidifying with acetic acid yields 2-(p-benzylamino-benzene-sulphonamido) pyridine which after recrystallisation from alcohol melts at 200°.

*Example 24*

9.7 grams of 1 amino-isoquinoline is dissolved in 20 cc. of pyridine and 16 grams of p-acetyl-amino-benzene-sulphonyl chloride added, the temperature being kept below 50° C. When the reaction is complete, water is added and the solid separated by filtration. After purification by dissolving in aqueous alcoholic sodium hydroxide solution and precipitation by acidifying with acetic acid, crystalline 1-(p-acetylamino-benzene-sulphonamido)-isoquinoline, melting point 225° C. is obtained.

The acetyl compound on hydrolysis with 10 parts of boiling 2N sodium hydroxide solution for 1 hour, followed by acidification with acetic acid gives 1-(p-amino - benzene - sulphonamido)-isoquinoline. Melting point 263° C.

*Example 25*

12.5 grams of 2-(p-amino-benzene-sulphonamido)-pyridine is dissolved in 30 cc. of 2N sodium hydroxide solution and 40 cc. of benzyl chloride gradually added with stirring. After standing for 1 hour, 100 cc. of dry ether is added, and the crude 2-(p-amino-benzene-sulphonbenzylamido)-pyridine filtered off and extracted with 150 c.c. of cold dilute hydrochloric acid. The residual 2-(p-amino-benzene-sulphonbenzyl-amido)-pyridine is filtered off and recrystallised from alcohol. It melts at 179° C.

*Example 26*

7 grams of p-diethylamino-azobenzene-p-sulphonyl chloride (prepared by the action of phosphorus pentachloride on sodium p-diethyl-amino-azo-benzene sulphonate) is added to 1.9 grams of 2-amino-pyridine dissolved in 20 cc. of pyridine and after the reaction is over water is added. The precipitated 2-(p-diethylaminoazobenzene-p-sulphonamido)-pyridine is filtered off, washed with water, and dissolved in 5 parts of 2N sodium hydroxide solution. The solution is warmed to 30–40° C. and solid sodium hydrosulphite added gradually until the red colour of the solution is discharged. Acetic acid is then added until the solution is faintly acid; on concentration 2-(p-amino-benzene - sulphonamido) - pyridine separates, and is purified by recrystallisation from alcohol. Melting point 190° C.

*Example 27*

3 grams of p-acetyl-amino-benzene sulphonyl chloride are suspended in 5 cc. of chloroform and 1 gram of 2 amino-pyridine dissolved in 5 cc. of water is added. To the mixture is added 2 grams of anhydrous sodium carbonate and the whole vigorously shaken at room temperature for 1 hour. The mixture is diluted with 20 cc. of water, the chloroform layer together with any undissolved solid separated off and the chloroform removed by distillation. The residue is boiled with 25 cc. of 2N sodium hydroxide for 30 minutes and the solution precipitated by addition of hot glacial acetic acid until acid to litmus. The crystalline precipitate of 2-(p-amino-benzene-sulphonamido)-pyridine is filtered off and recrystallised from acetone. It melts at 189–190° C.

*Example 28*

A mixture of 4.6 grams of p-acetylamino-benzenesulphon-methylamide, melting point 183° C., (obtained by the interaction of p-acetyl-aminobenzene-sulphonyl chloride and aqueous methylamine) 3.2 grams of 2-bromopyridine, 2.8 grams of potassium carbonate and 0.2 grams of copper powder is heated at 200° C. for 1 hour. The cooled melt is extracted with 50% acetic acid and the filtered extract is concentrated whereupon 2-(p-acetylamino - benzene - sulphon methylamido)-pyridine separates. Crystallised from dilute acetic acid, it melts at 231° C. Hydrolysis by boiling for 1 hour with 10 parts of 2N sodium hydroxide gives on acidification with acetic acid 2-(p-amino-benzene-sulphon-methylamido)-pyridine. Crystallised from alcohol it melts at 225° C.

*Example 29*

25 grams of phenyl-2-amino-pyridine-5-sulphonic acid is suspended in 55 cc. of pyridine and 24 grams of p-acetylamino-benzene-sulphonyl-chloride is added. After heating on a steam bath for 15 minutes, the mixture is diluted with 500 cc. of water and the precipitated phenyl-2(p-acetylamino-benzene-sulphonamido)-pyridine-5-sulphonate is collected. Crystallised from 50% acetic acid it melts at 175–185° C.

This ester on boiling for 1½ hours with ten times its weight of 2N sodium hydroxide solution and addition, with cooling, of hydrochloric acid until just acid to Congo red gives 2-(p-amino-benzene - sulphonamido) - pyridine - 5-sulphonic acid. Melting point 305° C.

*Example 30*

9.4 grams of 2 amino-pyridine is dissolved in 100 cc. of acetone and 11.6 grams of p-acetyl-amino-benzene-sulphonyl chloride is added. The mixture is boiled under reflux for 1 hour, the acetone removed by distillation and the residue treated with water. The 2-(p-acetylamino-benzene-sulphonamido)-pyridine so formed is collected. It melts at 224° C. when crystallised from aqueous alcohol.

*Example 31*

To 9.4 grams of 2-amino-pyridine at 55° C. is added 11.6 grams of p-acetylamino-benzene-sulphonyl chloride. When the reaction is over the melt is dissolved in 150 cc. of 2N sodium hydroxide solution and the mixture is boiled under reflux for 1 hour. Acidification with acetic acid precipitates 2(p-amino-benzene-sulphonamido)-pyridine which melts at 190° C. when crystallised from aqueous alcohol.

*Example 32*

A mixture of 15.8 grams of 5-nitro-2-chloro-pyridine, 21.4 grams of p-acetylamino-benzene sulphonamide, 13.5 grams of potassium carbonate (anhydrous) and 1.0 grams of copper powder is heated for 30 minutes at 180° C. The mixture is extracted with boiling water and filtered; acidification of the filtrate with acetic acid then gives 5 - nitro - 2 - (p - acetylamino-benzene-sulphonamido-pyridine. Melting point 264° C.

Example 33

To a solution of 2.2 grams of 5-iodo-2-aminopyridine in 7 cc. of pyridine is added 2.4 grams of p - acetylamino - benzene - sulphonyl chloride. When the reaction is over 70 cc. of water are added and the precipitate of 5-iodo-2-(p-acetylamino - benzene - sulphonamido)-pyridine is collected, washed with water and crystallised from 50% acetic acid. Melting point 234° C. Hydrolysis of this with 10 parts of 2N sodium hydroxide solution by boiling for 1 hour under reflux followed by addition of excess of 2N acetic acid gives 5-iodo-2-(p-aminobenzene-sulphonamido)-pyridine. Purified by solution in boiling aqueous alcoholic sodium hydroxide followed by addition of boiling dilute acetic acid, it melts at 219° C.

Example 34

4.3 grams of 2-methylamino-pyridine is dissolved in 20 cc. of pyridine and 9.5 grams of p-acetylamino-benzene-sulphonyl chloride is added. When the reaction mixture has cooled, 100 cc. of water are added and the precipitate of crude 2-(p - acetylamino-benzene-sulphonmethylamido)-pyridine is collected, washed and crystallised from dilute acetic acid. Melting point 231° C.

Example 35

10 grams of 2 - (p - aminobenzene - sulphonmethylamido) -pyridine (Example 21) is dissolved in 100 cc. of 2N hydro-chloric acid and 10 cc. of acetic anhydride followed by sufficient saturated sodium acetate solution to remove Congo red acidity are added. The precipitate of 2-(p-acetylamino - benzene - sulphonmethylamido)-pyridine is collected, washed and crystallised from dilute acetic acid. Melting point 231° C.

What we claim and desire to secure by Letters Patent is:

1. The preparation of compounds of the class consisting of p - amino - benzene-sulphonamido-pyridine and quinoline derivatives by the action of a benzene sulphonamide containing, in the para position, a substituent capable of conversion into an amino group, such substituent being a member of the class consisting of an acylamino group convertible to an amino group by hydrolysis, a nitro group convertible by reduction, an azo group convertible by reduction, and a halogen convertible by the action of ammonia, on a member of the class consisting of pyridine and quinoline compounds containing a reactive halogen substituent on the nucleus of that member.

2. In the process according to claim 1, the step which comprises reacting the said para-substituted benzene sulphonamide with the said member of the class consisting of pyridine and quinoline compounds containing a reactive halogen substituent on the nucleus of that member in the presence of potassium carbonate and copper.

ARTHUR JAMES EWINS.
MONTAGUE ALEXANDER PHILLIPS.